Patented July 28, 1931

1,815,979

UNITED STATES PATENT OFFICE

WILHELM KOLLE, OF FRANKFORT-ON-THE-MAIN, JULIUS HALLENSLEBEN, OF HOCHST-ON-THE-MAIN, AND KARL STREITWOLF AND HUGO BAUER, OF FRANKFORT-ON-THE-MAIN, GERMANY, ASSIGNORS, BY MESNE ASSIGNMENTS, TO WINTHROP CHEMICAL COMPANY, OF NEW YORK, N. Y., A CORPORATION OF NEW YORK

WATER SOLUBLE ORGANIC ARSENIC AND ANTIMONY COMPOUNDS AND PROCESS OF MAKING THE SAME

No Drawing. Application filed December 27, 1923, Serial No. 683,074, and in Germany December 27, 1922.

We have found that water-soluble arsenic and antimony compounds of excellent properties are obtained by causing ethylene-oxide, epihydrin alcohol,

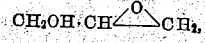

or homologues or derivatives thereof to act upon arsenobenzenes, stibiobenzenes and arsenostibiobenzenes and their arsonic and stibonic acids, containing one or several amino groups.

Besides the above mentioned residues there may also be introduced into the molecule any kinds of sugars by reacting simultaneously or consecutively, for instance with epihydrin alcohol or the like and, besides this, with any kinds of sugars which may also differ from each other, the reaction being conducted in such a manner that the epihydrin alcohol or a similar body is first caused to react and then the sugars or vice versa. Thus compounds which are soluble in water with neutral reaction are obtained which contain as substituent the residue of the ethylene oxide or its homologues as well as the residue of sugars. These compounds have the advantage of being readily soluble and of being well tolerated and are distinguished by their efficacy in the treatment of diseases caused by trypanosomes, recurrent spirochætae and bacteria producing syphilis.

Finally, instead of the arsenobenzenes and stibiobenzenes the benzenearsenous and benzenestibinous oxides and also the benzenearsines, containing at least one amino group, and the substitution products thereof may be caused to interact with ethylene oxide and the homologues or derivatives thereof, whereby compounds, being extremely soluble and possessing excellent therapeutic properties, are obtained. The new compounds may also be converted into arseno- or stibiobenzenes.

The character of the reaction which takes place in the formation of the new compounds is indicated in the following reaction equations:

(a) 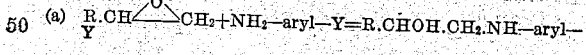

wherein R stands for —H, —CH$_3$, or —CH$_2$OH, and Y stands for As or SB in a trivalent or quinquevalent condition except the grouping —SbH$_2$.

(b) 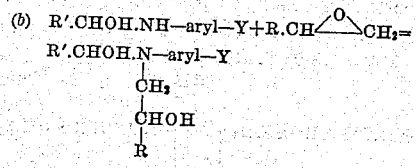

wherein R stands for —H, —CH$_3$, or —CH$_2$OH, R' stands for aldohexose residues and Y stands for As or Sb in a trivalent or quinquevalent condition except the grouping —SbH$_2$. Compounds in which according to the formulæ given in the foregoing equations Y stands for the grouping —SbH$_2$ cannot at the present time be prepared. The products are soluble in water and in solutions of common salt and form yellowish to gray partly hygroscopic powders.

The following examples illustrate our invention:—

(1) 18.3 gr. of 4.4'-hydroxy-3.3'-diaminoarsenobenzene are suspended in 50 ccm. of methyl alcohol and to the suspension there are then added 8,8 gr. of epihydrin alcohol. This suspension is allowed to stand in an atmosphere of nitrogen until it is completely dissolved, if necessary the reaction is to be assisted by heating to 65°. (The resulting intermediate product is probably a monoaddition product of the oxides used. The product is soluble in methyl alcohol, less soluble in ethyl alcohol and scarcely soluble in water). The reaction is complete as soon as a test sample drawn from the product remains clear when treated with a solution of common salt. The 4.4'-dihydroxy-3.3'-aminoarsenobenzene-di-dihydroxypropane is precipitated with alcohol and ether. The preparation shows a yellow colour and is readily soluble in water. The reaction can also be effected in water. In this case the methyl alcohol is replaced by the equivalent quantity of water. The product has the formula:

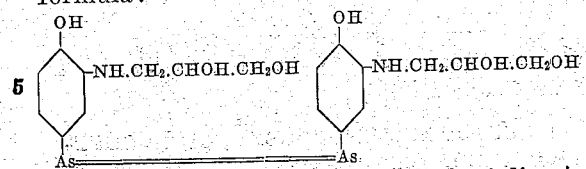

(2) 18.3 gr. of 4.4'-dihydroxy-3.3'-diaminoarsenobenzene are suspended in 40 ccm. of methyl alcohol and there are then added about 8 gr. of propylene oxide. The base quickly dissolves. The mixture is allowed to stand until a sample drawn therefrom is clearly soluble in water. If required the reaction is to be assisted by heating while well cooling on the reflux-cooler. The reaction product from 4,4'-dihydroxy-3',3'-diaminoarsenobenzene and propylene oxide is precipitated with alcohol and ether. The preparation thus obtained dissolves in water to a clear solution and is of a light yellow colour. The product has the formula:

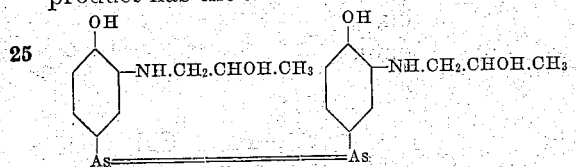

(3) 18.3 gr. of 3-3'-diamino-4-4'-dihydroxyarsenobenzene are suspended in 60 ccm. of methyl alcohol and to this suspension 10.0 gr. of ethylene oxide are added. The whole is shaken on the shaking-apparatus until the arsenobenzene is dissolved, and is then allowed to stand until a test-sample drawn therefrom dissolves in water to a clear solution. If required the reaction may be cautiously accelerated by heating to 50–60° in a well closed vessel. The reaction product obtained from ethylene oxide and the base is isolated by precipitating with alcohol and ether. The substance thus obtained forms a light yellow powder and is soluble in water to a clear solution. The product has the formula:

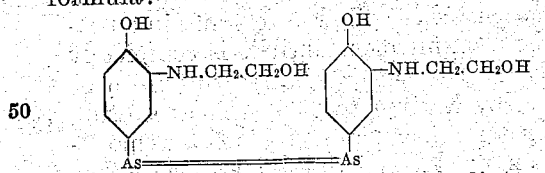

(4) 63.1 gr. of p-arsenobenzene-di-(1-phenyl-2.3-dimethyl-4-amino-5-pyrazolone) are suspended in 200 ccm. of methyl alcohol and there are then added 35 gr. of epihydrin alcohol. The base dissolves and the reaction is terminated as soon as a test sample drawn from the product remains clear when treated with a solution of common salt. If required, the reaction may be assisted by heating to 60° C. The p-arsenobenzene-di-(1-phenyl-2.3-dimethyl-4-amino-5-pyrazolonedihydroxypropane) is precipitated with ether and alcohol. The preparation shows a yellow colour and is soluble in water to a clear solution. The product has the formula:

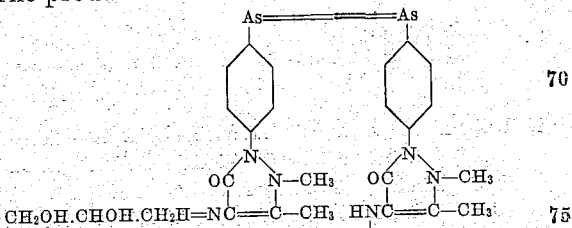

(5) 42.2 gr. of 3.3'-5.5'-tetramino-4.4'-dimethylamino-p-arsenobenzene are introduced into 200 ccm. of methyl alcohol and then 35 gr. of epihydrin alcohol are added thereto. The arsenobenzene dissolves and the reaction is complete as soon as a test sample taken from the product remains clear when treated with a solution of common salt. The 3.3'-5.5'-tetramino-4.4'-dimethylamino-p-arsenobenzene-tetra-dihydroxypropane is precipitated with alcohol and ether. The preparation has a yellow colour and is soluble in water. The product has the formula:

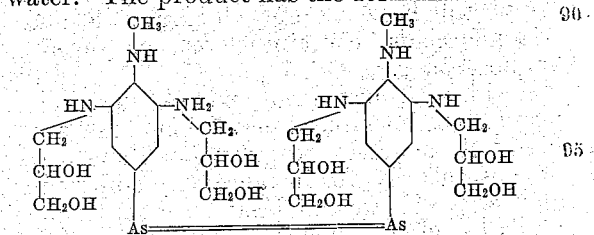

(6) 39.4 gr. of 4.4'-dimethoxy-3.3'-diamino-p-arsenobenzene are introduced into 50 ccm. of methyl alcohol and 17 gr. of epihydrin alcohol. The base dissolves. The reaction is complete as soon as a test-sample drawn from the product remains clear when treated with a solution of common salt. The course of the reaction may be facilitated by heating to 65°. The 4.4'-dimethoxy-3.3'-diamino-p-arsenobenzene-di-dihydroxypropane is precipitated by addition of alcohol and ether. It forms a light yellow powder and is soluble in water to a clear solution.

(7) 39.2 gr. of 4.4'-dimonomethylamino-3.3'-diamino-p-arsenobenzene are introduced together with 17 gr. of epihydrin-alcohol into 50 ccm. of methyl alcohol. After the base is dissolved it is precipitated by means of alcohol and ether and the 4.4'-dimonomethylamino-3.3'-diamino-p-arsenobenzene-di-dihydroxypropane is filtered off. The substance thus obtained is of a yellow colour and readily soluble in water. The product has the formula:

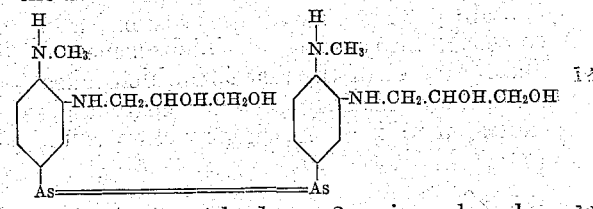

(8) 27.6 g. 4-hydroxy-3-amino phenylarsonate of sodium are dissolved in 30 ccm. of water and to this solution are added 50 g. of methyl alcohol and 8 g. of epihydrin alcohol. The reaction which may be assisted by heating to 65° is complete as soon as a test sample drawn from the product, shows no separation of the difficultly soluble, unaltered arsonic acid on the addition of a solution of common salt.

The sodium salt of the 4-hydroxy-3-amino dihydroxypropanephenyl arsonic acid is precipitated with alcohol and ether. This sodium salt as well as the free acid is soluble in water and alcohol.

The aqueous solutions of the above mentioned arsonic-derivatives are partly distinquished by an eminent stability and are intended to be used for therapeutical purposes. The product has the formula:

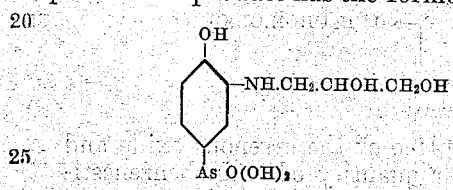

(9) 13.1 g. freshly precipitated 3-aminophenylstibonic acid are suspended in 10 ccm. water and to this suspension are added about 14 g. of epihydrin alcohol. The whole is then heated on the water-bath at 60° until it is dissolved and the reaction-product is precipitated from epihydrin alcohol and aminophenylstibonic acid with alcohol and ether. The product thus obtained is a grey powder, readily soluble in water.

Instead of the free acid there may also be used the sodium salt of the aminophenylstibonic acid. After the reaction is complete the product must be cautiously acidified. The product has the formula:

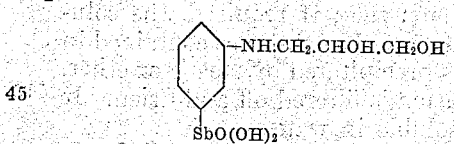

(10) 11.4 g. of 4.4'-dihydroxy-3.3'-diaminostibiobenzene are dissolved in 7 g. of caustic soda solution of 36% strength and diluted with 20 ccm. of water. To this solution are added 10 g. of epihydrin alcohol. The solution is allowed to stand until the addition of a solution of common salt does not cause any further precipitation in the reaction liquid. The product is precipitated by means of alcohol and ether, the precipitate being clearly soluble in water. The product has the formula:

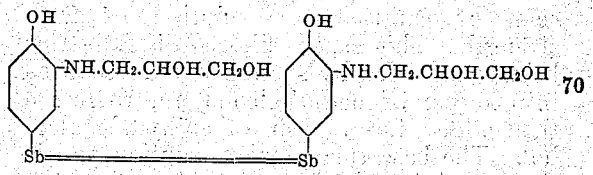

(11) 10.3 g. of 3.3'-diamino-4.4'-diohydroxyarsenostibiobenzene are dissolved in 7 g. of caustic soda solution of 36% strength and 15 ccm. of water. To this solution are added 10 g. of epihydrin alcohol. The reaction is complete as soon as the addition of a solution of common salt does not produce any precipitation in the liquid. The preparation is precipitated with alcohol and ether and is clearly soluble in water. The product has the formula:

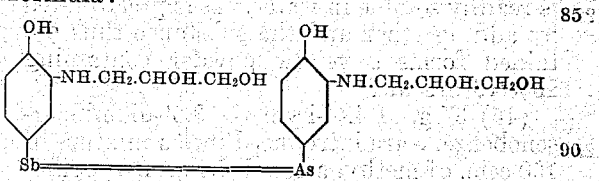

(12) 12 g. of the hydrochloride of 4.4'-dihydroxy-3.3'-diaminoarsenobenzene, dissolved in 120 ccm. of water, are mixed with 24 g. of glucose. By the addition of 24 ccm. of double-normal caustic soda solution the free base is precipitated. To this mixture are added in small portions 4 ccm. of epihydrin alcohol while heating to 40-50° and stirring. Thus a clear yellow solution is obtained which is precipitated by introducing it into a mixture of 2 litres of alcohol and 500 ccm. of ether. The preparation is a yellow powder readily soluble in water with a neutral reaction. It contains 20% of arsenic.

(13) 10 g. of the hydrochloride of 4.4'-bismethylamino-3.3'-5.5'-tetraminoarsenobenzene, dissolved in 150 ccm. of water are mixed with 33.3 ccm. of double-normal caustic soda solution for the purpose of precipating the free base. After having added 22 g. of glucose there are further added 5 ccm. of epihydrin alcohol in small portion while stirring and heating to 40-50°. The yellow solution thus obtained is permanently stable when air is excluded. By precipitation with alcohol and ether the substance can be obtained in a solid form. It then forms a yellow powder which contains 20% of arsenic. The product has the formula:

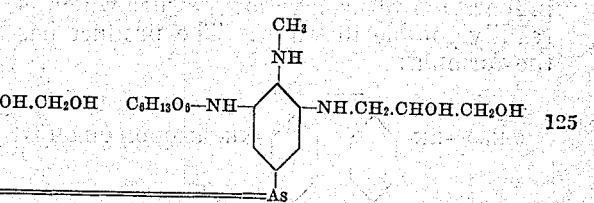

(14) 5,68 g. of the hydrochloride of 4.4'-bismethylamino-3.3'-5.5'-tetraminoarsenobenzene are dissolved in 50 ccm. of water and the base is precipitated with about 20 ccm. of caustic soda solution of 20% strength. This base is filtered off and after being well dried by suction it is introduced into 30 ccm. of methyl alcohol and there are then added 1.5-1.7 ccm. of epihydrin alcohol. The base turns into a solution and is then precipitated with ether; if required the reaction is assisted by heating to 60°. The preparation thus obtained is almost insoluble in water.

5 g. of the reaction product obtained as above indicated from hydrochloride of 4.4'-bismethylamino-3.3'-5.5'-tetraminoarsenobenzene and epihydrin alcohol are subjected to reaction with 2.7 g. of galactose in methyl alcoholic solution, eventually while adding water. The reaction product now obtained is readily soluble in water. It is precipitated by adding ether and the substance thus obtained forms a yellow powder containing 20% of arsenic.

(15) 37 g. of 4.4'-hydroxy 3.3'-diaminoarsenobenzene are introduced into a mixture of 150 ccm. of methyl alcohol, 7.4 ccm. of epihydrin alcohol and 30 ccm. of water and the whole is heated to 60° C. until it is dissolved. This solution is filtered and the reaction product precipitated with ether. If desired this preparation may be dissolved in alcohol and subsequently re-precipitated with ether.

40.5 g. of the reaction product obtained from epihydrin alcohol and 4.4' hydroxy-3.3'-diaminoarsenobenzene as above indicated are heated at 50° in a solution of 5 ccm. of galactose in 75 ccm. of water until a test-sample drawn from the product remains clear when treated with a solution of common salt. The whole is then filtered and the substance precipitated by means of alcohol. The substance thus obtained forms a yellow powder and is readily soluble in water. It contains 20% of arsenic.

(16) 12 g. of the hydrochloride of 4.4''-hydroxy-3.3'-diaminoarsenobenzene, dissolved in 120 ccm. of water are mixed with 24 g. of galactose. By adding 24 ccm. of double-normal caustic soda solution the free base is precipitated. To the mixture are added 3 ccm. of propylene oxide and the whole is heated to 40-50° C. while stirring and cooling in the reflux apparatus. Thus a clear yellow solution is obtained which is precipitated with alcohol and ether. The resulting preparation forms a yellow powder which is readily soluble in water. The product has the formula:

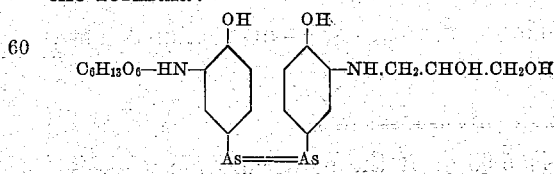

(17) 19.9 g. of 4-hydroxy-3-aminobenzene-arsenous oxide are introduced into 50 g. of methyl alcohol and there are then added about 12 g. of epihydrin alcohol. This mixture is allowed to stand until the reaction is complete. The reaction may eventually be accelerated by heating to 60°. The reaction is complete as soon as a test-sample shows no precipitation on addition of a solution of common salt. It is then filtered and the substance dissolved in the filtrate, is precipitated by means of ether. The precipitated substance is filtered off and dried. The preparation thus obtained is clearly soluble in water. Instead of a free base the hydrochloride may also be used.

The above-described product has the formula:

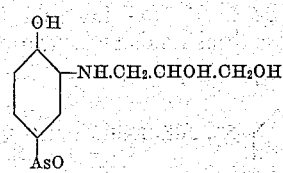

If in the place of the arsenous oxide and equimolecular quantity of aminobenzenestibinous oxide is used, preparations are obtained which possess analogous properties.

The product has the formula:

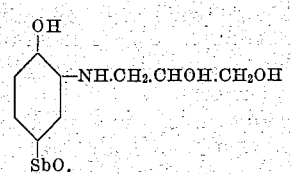

(18) 18.5 g. of 4-hydroxy-3-aminobenzene arsine are dissolved in 40,6 g. of ethyl alcohol and to this solution 8,1 g. of epihydrin alcohol are added. The whole is then heated to about 60° while excluding air until the test-sample remains clear on addition of a solution of common salt; if required, the solution is filtered and the substance contained in the filtrate is precipitated by means of ether. The preparation is filtered off and dried. It is entirely soluble in water.

If the above operations are carried out under other molecular proportions, there are also obtained readily soluble products.

Having now described our invention what we claim is:

1. As new products the compounds of the general formula:

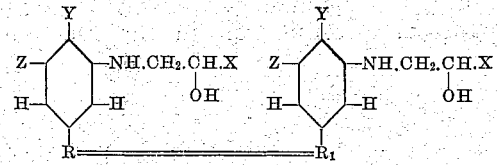

wherein R and $R_1$ represents As or Sb, X represents H, $CH_3$ or $CH_2.OH$, Y represents hydrogen, hydroxy, alkoxy, amino or substituted amino and Z represents hydrogen, amino or substituted amino.

2. As new products the compounds of the general formula:

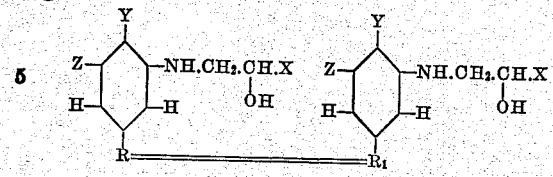

wherein R and R₁ represents As or Sb, X represents H, CH₃ or CH₂.OH, Y represents hydrogen, hydroxy, alkoxy, amino or substituted amino and Z represents the group:

or the group:

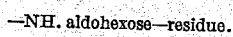

3. As new products compounds of the following formula:

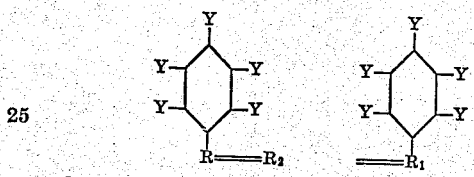

wherein R₂ stand for oxygen or the residue R and R₁ represent As or Sb, at least one Y stands for an amino group substituted by —CH₂.CH₂OH, —CH₂CHOH.CH₂OH, or —CH₂CHOH.CH₃ and the other Y's represent hydrogen, hydroxy, alkoxy, amino or substituted amino.

4. As new products compounds of the following formula:

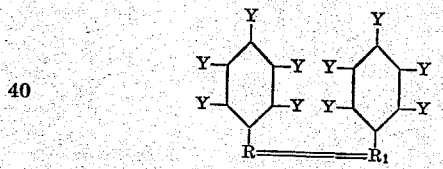

wherein R and R₁ represent As or Sb, at least one Y stands for an amino group substituted by —CH₂.CH₂OH, —CH₂CHOH.CH₂OH, or CH₂CHOH.CH₃ and the other Y's represent hydrogen, hydroxy, alkoxy, amino or substituted amino.

In testimony whereof, we affix our signatures.

WILHELM KOLLE.
Dr. JULIUS HALLENSLEBEN.
Dr. KARL STREITWOLF.
Dr. HUGO BAUER.

CERTIFICATE OF CORRECTION.

Patent No. 1,815,979.                                                   Granted July 28, 1931, to

WILHELM KOLLE ET AL.

It is hereby certified that error appears in the printed specification of the above numbered patent requiring correction as follows: Page 2, after the formula, lines 90 to 98, inclusive, insert the following paragraph: "The proportions of the reacting compounds may be altered to effect substitution of but one amido group."; page 3, lines 74 and 75, for the word "diohydroxyarsenostibiobenzene" read dihydroxyarsenostibiobenzene; and that the said Letters Patent should be read with these corrections therein that the same may conform to the record of the case in the Patent Office.

Signed and sealed this 3rd day of November, A. D. 1931.

(Seal)                                                                                      M. J. Moore,
Acting Commissioner of Patents.